INVENTOR
Henry de Beaumont

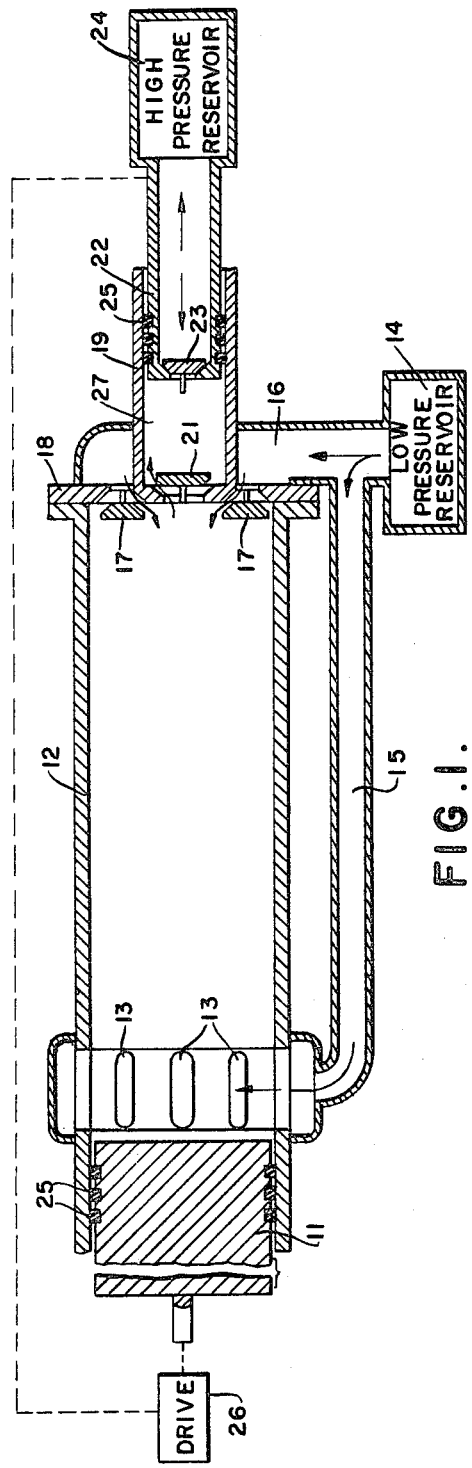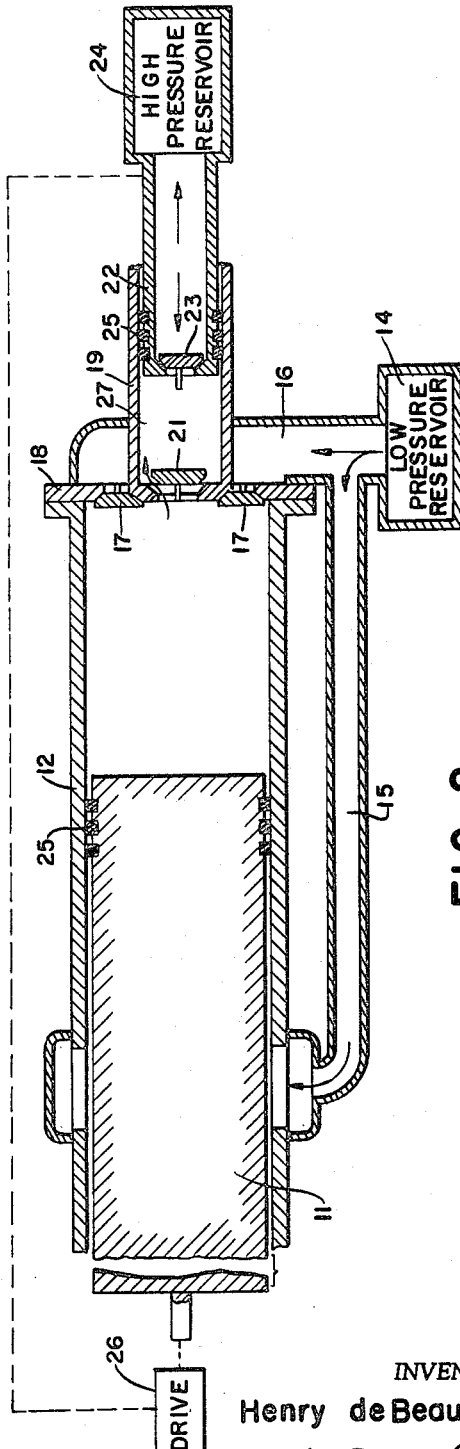

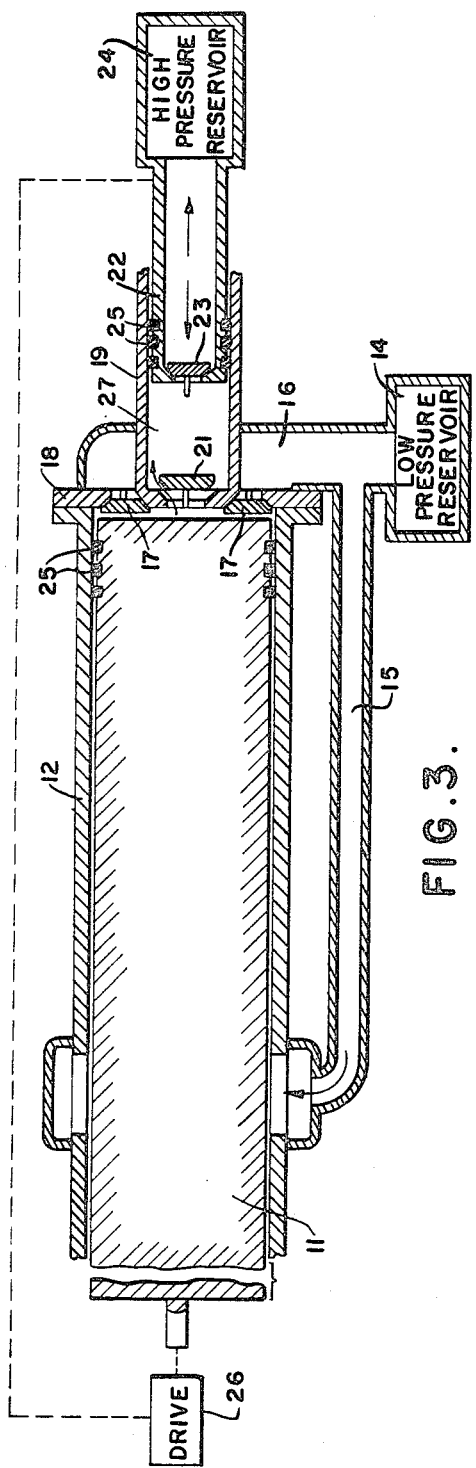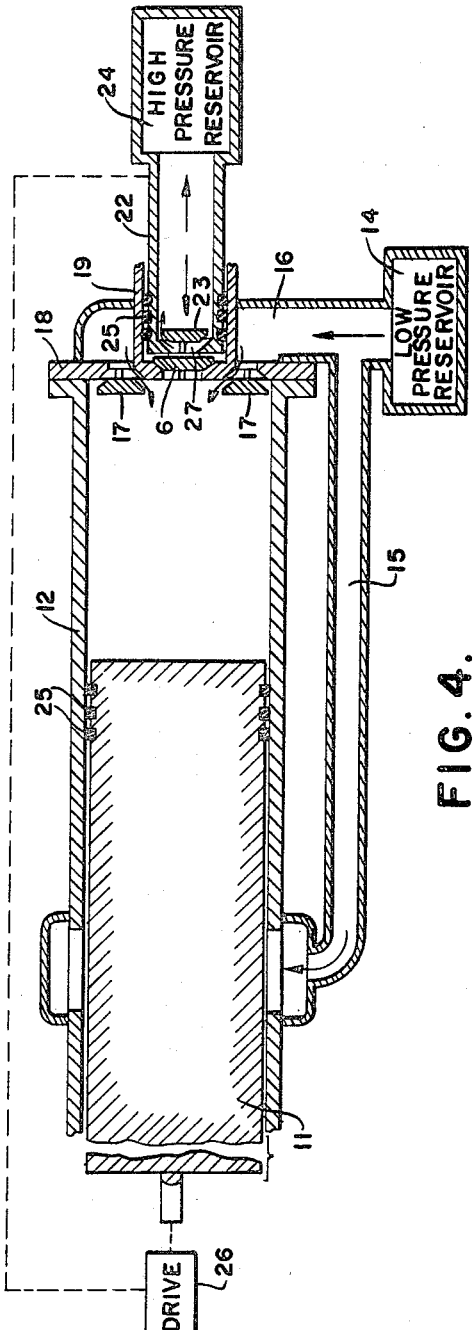

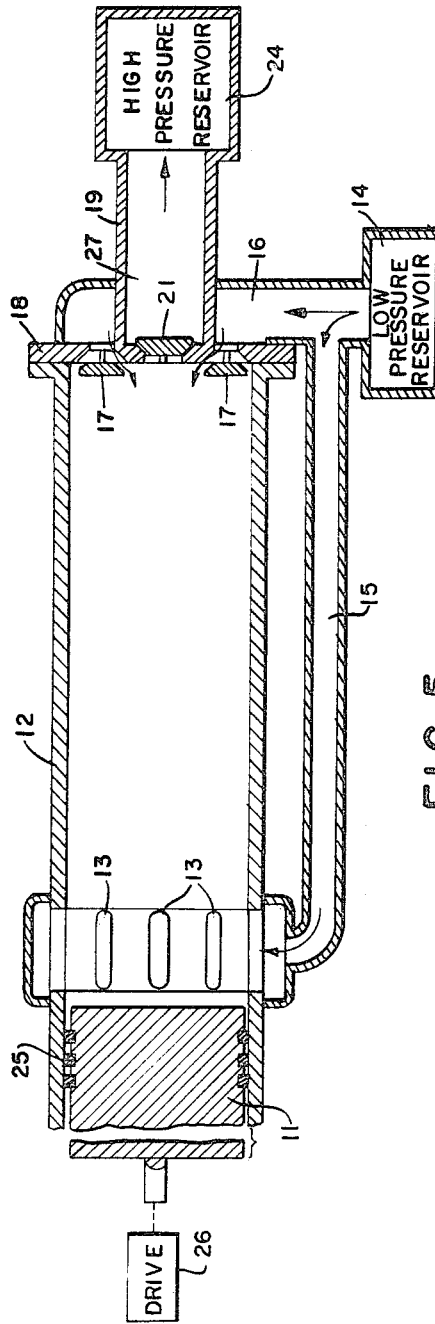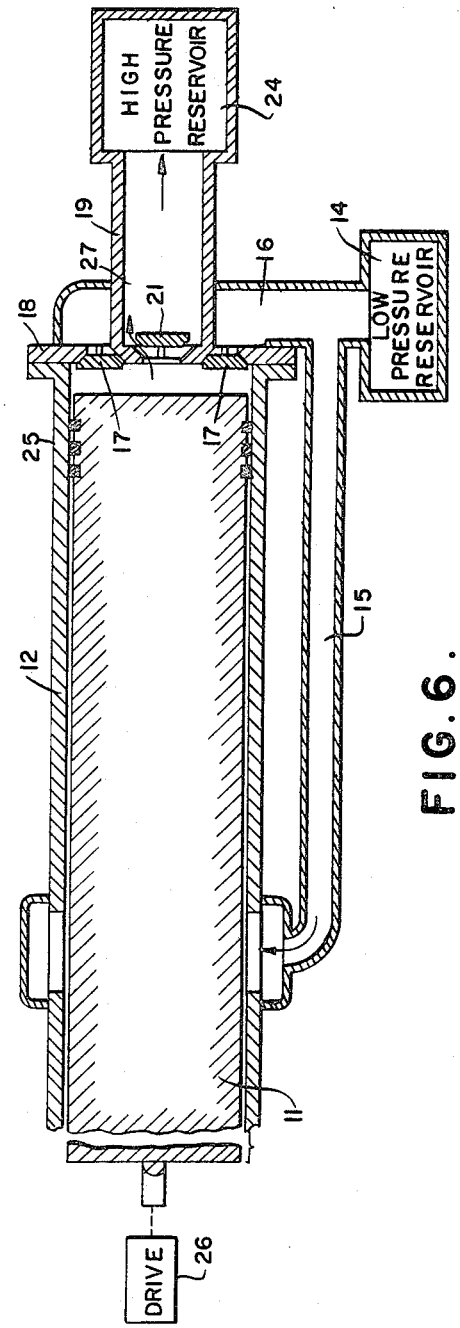

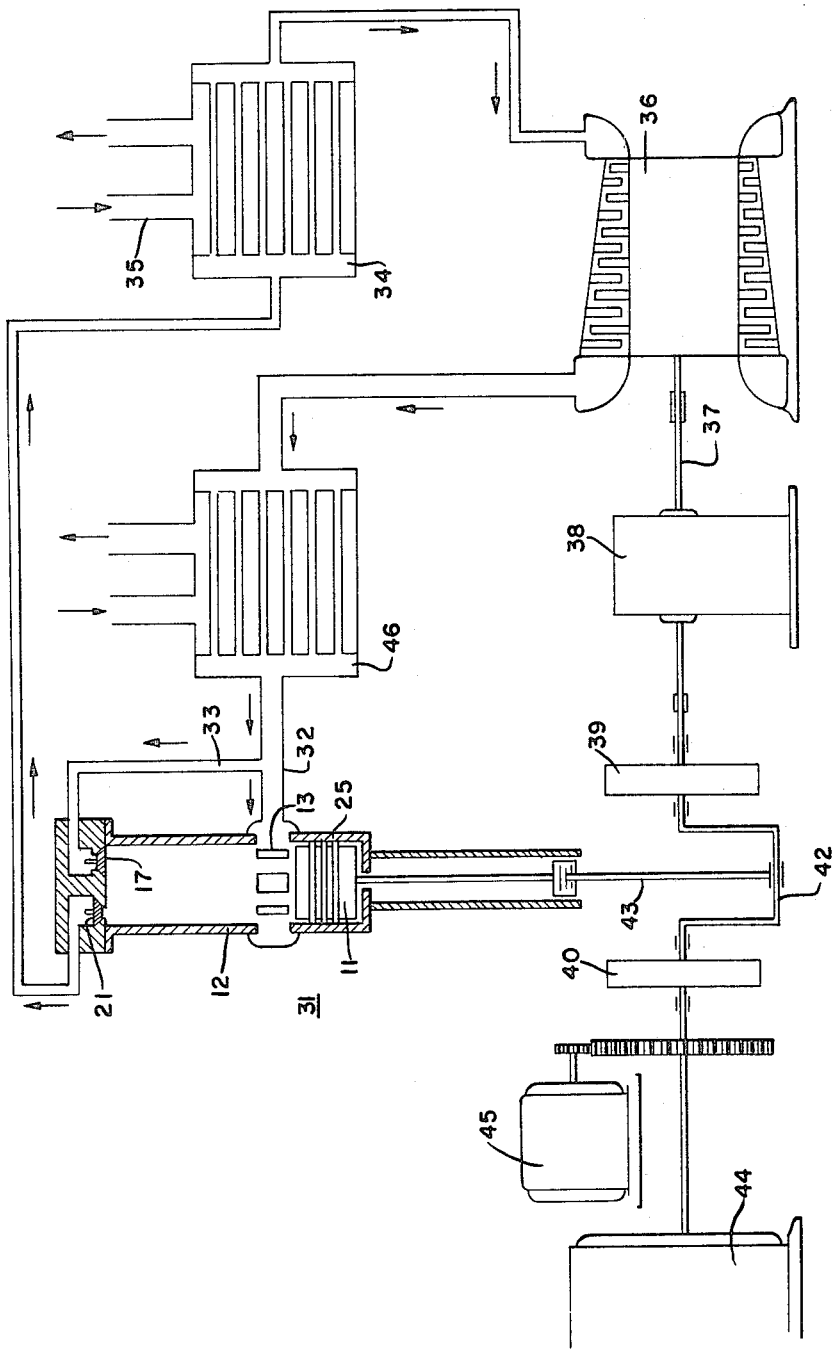

BY

ATTORNEY

June 11, 1968          H. DE BEAUMONT          3,387,773

THERMODYNAMIC PROCESS AND APPARATUS

Filed June 28, 1966          6 Sheets-Sheet 6

*INVENTOR*
Henry de Beaumont

BY

*ATTORNEY*

United States Patent Office 3,387,773
Patented June 11, 1968

3,387,773
THERMODYNAMIC PROCESS AND APPARATUS
Henry de Beaumont, Nazelles, France, assignor to Societe pour l'Utilisation Rationnelle des Fluides
Filed June 28, 1966, Ser. No. 561,209
Claims priority, application France, July 8, 1965, 23,869
42 Claims. (Cl. 230—172)

ABSTRACT OF THE DISCLOSURE

Disclosed is a method of compressing gases at a velocity in excess of the thermic wave front velocity of the gas. Compression is attained by selectively feeding low pressure gas into a cylinder having a piston driven with the velocity greater than the thermic wave velocity of the gas. One embodiment includes a pair of reciprocally driven pistons in separate cylinders, while another embodiment includes a single piston and cylinder. The compressor is disclosed as functioning in conjunction with a motor drive means and a refrigeration system.

---

The present invention relates generally to thermodynamic processes and machines and more particularly to a thermodynamic process and machine wherein transient energy of a gas is devired by compressing the gas at a velocity considerably in excess of the thermic wave front velocity of the gas and is converted to internal energy of the gas.

In my co-pending application, Ser. No. 538,430, filed Mar. 29, 1966, it is reported that the local velocity of a thermic or thermal wave front as it propagates, by conduction, through a gaseous medium, depends upon the temperature and the pressure of the medium at any point through which the wave is traversing. In particular, it is shown that the local velocity, C, of a thermic wave front is given by:

$$C = \sqrt{\frac{\lambda}{c_v \rho k}} \qquad (1)$$

where:

$\lambda$ = thermic conductivity of the gas at the point where the wave is passing;
$c_v$ = specific heat capacity of the gas at constant volume per unit mass;
$\rho$ = density of the gaseous medium at the point through which the wave is traversing; and
$k$ is a characteristic constant related to the inherent properties of the gas.

The constant $k$ of Equation 1 has as a dimensional unit the quantity time and depends solely upon the physical characteristics of the gas and not, apparently, upon the physical state of the gaseous body. In general, the constant $k$ has a value of the order of a few milliseconds. Assuming the value of $k$ to be equal to one millisecond, a rough calculation based upon Equation 1 yields propagation velocity of a thermic wave to be on the order of 0.1 meter per second through a propagation medium of air maintained at room temperature and pressure. If temperature is maintained uniform throughout a medium in which the thermic wave is being propagated, and the thermic wave is derived in response to a sudden pressure increase, which propagates at the speed of sound, thermic waves are produced together at the same time at every point throughout the medium.

Because of the thermic waves are produced together at the same time in every point throughout the medium and the temperature of the gas is uniform, the equation of energy, in an adiabatic process, can be expressed as:

$$k \frac{d^2 U}{dt^2} + \frac{dU}{dt} + p \frac{dV}{dt} = 0 \qquad (2)$$

In Equation 2, kinetic energy of the gas is neglected, a valid assumption in view of the energies of the other terms in the equation. In Equation 2, the term $$p \frac{dV}{dt}$$

is indicative of the power derived from the gas at a time $t$ when it occupies a volume V. For example, $p$ is the pressure that the gas exerts against a moving piston at the time $t$. The term U in Equation 2 is the intrinsic or internal energy of the gas, while the term $k$ is defined, supra.

Equation 2 is derived by considering that the total energy of the gas at the time instant, $t$, is $$U + k \frac{dU}{dt}$$

where the term $$k \frac{dU}{dt}$$

precisely represents the energy which has been referred to herein as "transient energy." Transient energy is specifically found only in conjunction with thermodynamic systems, i.e., systems in which the internal energy of a gas varies as a function of time, and is not a factor in thermostatic situations. The power at any instant of time in a thermodynamic process wherein transient energy is considered is derived by differentiating the sum of the internal and transient energies of the gas, whereby the terms involving internal and transient energy in Equation 2 are derived as:

$$\frac{d}{dt}\left(U + k \frac{dU}{dt}\right) = \frac{dU}{dt} + k \frac{d^2 U}{dt^2} \qquad (3)$$

Consideration will now be given to a theoretical explanation of transient energy. If S denotes the entropy of the gas considered, supra, and T the Kelvin Temperature of the gas, classical theories of theromodynamics result in:

$$\frac{dU}{dt} + p \frac{dV}{dt} = T \frac{dS}{dt} \qquad (4)$$

Substituting Equation 4 into Equation 2 yields:

$$k \frac{d^2 U}{dt^2} + T \frac{dS}{dt} = 0 \qquad (5)$$

Integrating Equation 5 with respect to time between the states of thermic rest, A and B, at which states $$\frac{dU}{dt} = 0$$

whereby:

$$\int_{\left(\frac{dU}{dt}\right)_A = 0}^{\left(\frac{dU}{dt}\right)_B = 0} k \frac{d^2 U}{dt^2} dt = 0 \qquad (6)$$

yields:

$$\int_A^B T dS = 0 \qquad (7)$$

Equation 7 is a line integral equation between points A and B which represents a dynamic adiabatic process. In classical thermodynamic processes, the portion of the cycle represented by Equation 7, in an adiabatic operation, is a vertical line on a typical diagram wherein temperature is merely isentropic.

According to the present invention, it has been found that the dynamic adiabatic relationship indicated by Equation 7 can be derived in an adiabatic process by compressing the gas with a very high initial acceleration, at a velocity on the order of 100 times the thermic wave front propagation velocity. Such a compression process essentially remains close to isothermal during most of the volumetric reduction, causing entropy to decrease at a very sharp linear rate. Towards the end of the volumetric reduction, entropy and temperature both increase until the gas is in a static condition, at state B, with final entropy loss. By compressing the gas at a velocity substantially greater than the velocity of propagation of the local thermic waves in the gas, the temperature and pressure of the gas are far below those values calculated utilizing Laplace's law for ideal gases in an isentropic process, wherein Laplace's law is stated as:

$$PV^\gamma = K$$

where:

$\gamma$ is the ratio of specific heat of the gas at constant pressure to the specific heat at constant volume; and
K is a constant.

The theoretical consideration given, supra, is more readily understood by considering, as an exemplary case, a cylinder and piston combination that is utilized for compressing a volume of gas. Initially, it is assumed that the piston starts abruptly from a state of rest so that it is driven at a velocity in excess of, or approximately equal to, 100 times the thermic wave propagation velocity in a time interval of a few milliseconds. The acceleration required for the piston to start with such abruptness is generally on the order of 200 $g$'s, where $g$ is the acceleration of gravity. Under these conditions, the gas is compressed in a dynamic adiabatic manner in accordance with Equation 7.

In response to the piston motion described, the statistical distribution of the gas molecules in the mass being considered has a net motion in the direction of the piston displacement. This net motion is distinct from the usual random and zero statistical distribution of the motion of the gas molecules when the gas is in a condition of rest. The net velocity of the gas molecules results in the derivation of the energy expression $$k\frac{dU}{dt}$$

referred to hereafter as "coordinate transient energy." The coordinate transient energy in the process described is, for a time, considerably greater than the internal energy increase of the gas at the same time and, as a result, is considered as a dominating factor in establishing the energy of the gas in the cylinder.

Because of the relatively large value of the constant $k$ and large value of $$\frac{dU}{dt}$$

the transient energy $$\left(k\frac{dU}{dt}\right)$$

is considerably larger than the internal energy increase. The relatively large value of the $$k\frac{dU}{dt}$$

term in processes operated in accordance with the present invention retards the derivation of heat energy normally associated with internal energy of a gas during a typical prior art compression operation. As a consequence of the heat energy retardation, the gas during the compressing step remains substantially quasi-isothermal.

At the end of the piston stroke, when the piston reaches the top dead center in the cylinder and the gas is at quasi-constant volume, the gas returns to its usual state wherein the molecules have zero net velocity and their motion is considered random for statistical purposes. With the piston resting at top dead center, the coordinate transient energy is transferred into internal energy of the gas, whereby the gas is heated because its internal energy is increased.

The foregoing physical explanation of the conversion of transient energy into internal energy in a piston compression device moving with the velocity and acceleration indicated supra is now formulated and computed. Provisionally, it is assumed that the gas is compressed in an isothermal manner so that the work done by the piston is expressed in accordance with an isothermal compression of the type associated with classical thermodynamic theory. In the presently considered instance, however, the system functions in a manner different from that of a conventional system since the energy of compression is stored in the gas as a transient term, rather than being transferred to the exterior environment of the cylinder through the walls by forced cooling. Hence, the work of the compression stroke can be considered as:

$$p_0 V_0 \log \frac{V_0}{V_1} \qquad (8)$$

where:

$p_0$ is the pressure in the cylinder prior to translation of the piston;
log is logarithm to the base $e$;
$V_0$ is the initial volume of the gas; and
$V_1$ is the final volume of the gas.

After the piston has compressed the gas and is sitting at top dead center in the cylinder and the coordinate transient energy of the gas has been transferred to internal energy stored in the gas, the internal energy of the gas is expressed as:

$$U = \frac{p_1 V_1 - p_0 V_0}{\gamma - 1} \qquad (9)$$

where:

$p_1$ = the pressure of the gas after the conversion from coordinate transient energy to internal energy has taken place;
$\gamma$ = the ratio of specific heat at constant pressure to specific heat at constant volume, $C_p/C_v$.

Since the work done by the compression stroke on the gas equals the internal energy stored in the gas after the coordinate transient energy has been transferred to internal energy, Equations 8 and 9 can be set equal to each other to derive:

$$\frac{p_1 V_1}{p_0 V_0} = \frac{T_1}{T_0} = 1 + (\gamma - 1) \log \frac{V_0}{V_1} \qquad (10)$$

Equation 10 effectively relates the pressure and volume of the gas at the initial and final states of rest of the piston, assuming that the piston traveled at a velocity great enough to consider the coordinate transient energy of the gas. If the conversion of the coordinate transient energy of the gas to internal energy is ignored, the gas while undergoing an isentropic process would have a final pressure, $P_1$, according to classical thermodynamic considerations involving Laplace's gas law of:

$$P_1 V_1^\gamma = p_0 V_0^\gamma \qquad (11)$$

The departure from isentropic of processes operated in accordance with the present invention can be evaluated from the ratio of the pressures, $p_1$ and $P_1$, as indicated by Equations 9 and 10, by compressing the same gas between the same initial and final volumes ($V_0$ and $V_1$, respectively) and the same initial pressure, $p_0$. In other words, the ratio of the effective pressure, $p_1$, computed in accordance with Equation 10 to the larger isentropic pressure $P_1$, computed in accordance with Equation 11, serves as an indication of the amount which a gas compressed according to the present invention departs from isentropic conditions. The ratio between the measured values of $p_1$ and $P_1$ is given as:

$$\frac{p_1}{P_1}=\left[1+(\gamma-1)\cdot\log\frac{V_0}{V_1}\right]\left(\frac{V_1}{V_0}\right)^{\gamma-1} \quad (12)$$

Equation 10 can also be derived in a more general manner by assuming that a process is not isothermal, but that it is merely isothermal in the interval while the gas is being compressed and is isochore, i.e., has constant volume, when the piston is at rest, at top dead center. This more general approach is derived by relying upon the line integral Equation 7. As the piston compresses the gas between the two rest states, A and B, where $$\frac{dU}{dt}=0$$

i.e., during an isothermal reduction in the volume of the gas from $V_0$ to $V_1$, entropy, S, except for an additive constant, is expressed as:

$$S=C\log T_0+(C_p-C_v)\log V \quad (13)$$

Differentiating Equation 13 with respect to volume yields:

$$dS=(C_p-C_v)\frac{dV}{V} \quad (14)$$

Substituting Equation 14 into Equation 7 and integrating between the initial and fiinal volume, gives:

$$\int_{V_0}^{V_1}T_0 dS=\int_{V_0}^{V_1}\frac{T_0(C_p-C_v)}{V}dV=T_0(C_p-C_v)\log\frac{V_1}{V_0} \quad (15)$$

After the piston has reached top dead center, the gas volume remains quasi-constant and its temperature increases in response to the transfer of the coordinate transient energy into internal energy of the gas. Hence, while the piston is resting at top dead center, entropy is:

$$S=C_v\log T+(C_p-C_v)\log V_1 \quad (16)$$

Differentiating Equation 16 gives:

$$dS=\frac{C_v}{T}dt \quad (17)$$

which when substituted into Equation 7 for the isochore portion of the cycle, yields:

$$\int_{T_0}^{T_1}TdS=\int_{T_0}^{T_1}T\frac{C_v}{T}dT=C_v(T_1-T_0) \quad (18)$$

According to classical thermodynamic theory, the right-hand portion of Equation 18 can be re-written as:

$$C_v(T_1-T_0)=\frac{P_1V_1-P_0V_0}{\gamma-1} \quad (19)$$

By adding the quantities derived during the two portions of the cycle (i.e., during the isothermal compression and the isochore temperature rise, as indicated by Equations 13 and 19, the total heat in the system is expressed as:

$$\int_A^B TdS=(C_p-C_v)T_0\log\frac{V_1}{V_0}+\frac{P_1V_1-P_0V_0}{\gamma-1}=0 \quad (20)$$

Theoretical Equation 20 for the general situation provides exactly the same results as given supra by Equation 10 from simple specific physical considerations.

Mathematical and experimental verification of the foregoing theoretical analysis will now be made assuming that ideal monatomic and diatomic gases, having theoretical values of gamma of five-thirds and seven-fifths, respectively, are employed. Theoretical values of the pressure in the cylinder after the coordinate transient energy has been transformed into internal energy will be computed in accordance with Equation 12, supra, while the actual results of the tests will be derived by measuring the initial and final gas volumes, the initial and final gas pressures, and from these ratios measuring the ratio of the actual final gas pressure to the final gas pressure that would have occurred in an isentropic process according to classical theory in accordance with:

$$\frac{p_1}{P_1}=\frac{p_1}{p_0}\left(\frac{V_1}{V_0}\right)^{\gamma} \quad (21)$$

Tests were conducted by utilizing the monatomic gas helium and the diatomic gas nitrogen. The tests were conducted by utilizing a vertical piston compressor, having a chamber with a length of 19 centimeters and a maximum volume of 406 cubic centimeters. The piston and compression chamber were both fabricated from steel, the piston being a massive block with a relatively short but thick driving rod, having a square section at its driven end. The piston and driving rod together weighed a total of 3,500 grams. Greased rings were provided in the piston chamber and compression was performed axially in response to a sudden, isolated vertical shock imposed on the piston through a short, thick rod striking the cross section of the piston rod. The piston was allowed to move freely in response to the shock imparted to its rod and was subjected only to the reaction of the gas pressure in the cylinder chamber. In response to the shock imparted to the piston, the piston initial velocity did not exceed ten meters per second and traversed the length of the chamber in approximately 0.02 second. The abruptness of the piston from a rest condition to transitory motion was so great that a plot of velocity against time resulted in an initial angular discontinuity which made it impossible to determine the time required to attain initial velocity. From these facts, it has been estimated that the initial acceleration of the piston was at least on the order of 200 $g$'s.

The pressure in the cylinder was measured utilizing modern high-accuracy techniques. In particular, a piezo-electric quartz crystal was utilized for measuring pressure within the cylinder and time was electronically recorded in response to an oscillating network formed from a tuning fork frequency standard. The piston displacement was measured with a potentiometer to determine initial and final volumes, as well as the time when the upper dead center rest position was reached.

By utilizing the apparatus and techniques indicated, supra, the following table was evolved to show the close conformity of the tested data with the theoretical considerations derived.

TABLE 1

| $\frac{V_0-V_1}{V_0}$ | $\frac{P_1}{P_1}$ | | | |
|---|---|---|---|---|
| | Nitrogen | | Helium | |
| | Calculated | Tested | Calculated | Tested |
| 0.00 | 1 | 1 | 1 | 1 |
| 0.25 | 0.994 | 0.98 | 0.984 | 0.98 |
| 0.50 | 0.968 | 0.96 | 0.922 | 0.89 |
| 0.75 | 0.892 | 0.90 | 0.765 | 0.74 |
| 0.875 | 0.797 | 0.80 | 0.597 | 0.60 |
| 0.90 | 0.765 | 0.75 | 0.546 | 0.56 |
| 0.95 | 0.662 | | 0.410 | |

The figures in the table provide excellent experimental confirmations of the theory given, supra, when it is considered that the differences between the calculated and experimental results are less than: 1.5 percent for diatomic nitrogen and 4 percent for monatomic helium. The errors have been evaluated and experimentally verified to be due to causes, such as, gas leakage through the piston rings, deviations of the actual gases from the theoretical values of gamma, and errors in measurement, although the latter are less than $\pm 2$ percent.

It is to be noted that the results given by Table 1, Equation 12 and Equation 21 are not dependent upon initial temperature and pressure of the gas, but only the ratios between the initial and final gas temperatures and volume. In consequence, initial pressure and temperature were not recorded for each individual test but the ratios were accurately computed.

The foregoing theoretical discussion and experimental results can be summarized to provide two aspects, which are considered to be equivalent, of the invention. The first point is that in a process wherein the gas is compressed with a sufficiently high velocity, whereby coordinate transient energy becomes a significant factor, a steady or linear decrease of entropy occurs during an adiabatic compression. The second aspect is that in such processes the energy of the gas as first manifested as transient energy which is not converted into internal energy of the gas until after the compression operation has been completed and the gas is maintained at constant volume. By relying upon the first noted phenomena, thermodynamic cycles can be improved by transferring thermic energy into mechanical power, in machines such as heat exchangers, combustion chambers, expansion cylinders and turbines, or nozzles in jet aircraft. Hence, machines of the above classes operated in accordance with the invention produce exhaust gases that are cooler than is attained in such machines using prior art techniques. In addition, larger thrust and power are, in general, available for a given amount of fuel or energy expended.

The second point, supra, relating to the delay in the temperature rise of the gas due to the derivation of transient energy, is of considerable benefit in compressors, of the type described. Compressors functioning in accordance with the invention can be operated without cooling, whereby the considerable energy expended in prior art compressors for cooling purposes is not required. Compressors operated in accordance with the techniques of the present invention operate at a lower temperature because the temperature increase of the gas during the compression stroke is delayed and ultimately reduced during the constant volume portion of the cycle.

Single stage compressors operated in accordance with the principles and techniques of the present invention are capable of compressing a gas to the same extent as typical prior art compressors requiring two stages. The higher amount of compression attained results because of the pressure increase that occurs in response to transformation of the coordinate transient energy into internal energy of the gas. In one apparatus embodiment of the invention, the resulting increase in pressure shuts a valve at the end of a cylinder, where top dead center of the piston occurs, in such a way that the pressure exerted on the piston by the compressed and expanding mass of gas between the piston phase and the top of the cylinder is relieved.

It is, accordingly, an object of the present invention to provide a new and improved technique for operating thermodynamic machines, wherein the transient energy of gases is utilized.

Another object of the present invention is to provide a method for operating compressors, whereby the need for heat exchangers is obviated, and higher compression ratios are attained.

Another object of the present invention is to provide a thermodynamic process and apparatus wherein a gas is compressed in a manner to achieve a linear decrease of entropy during an adiabatic operation.

A further object of the present invention is to provide a method for operating a thermodynamic machine wherein the temperature rise normally associated with the compression of gases is delayed until after the gas has reached a state of thermal rest.

Still a further object of the invention is to provide a new and improved single stage compressor that is capable of increasing the pressure of a gas in excess of 50 times.

Another object of the present invention is to provide a compressor that relies upon transient energy, as well as motor and refrigeration systems that employ such a compressor.

The above and still further objects, features, and advantages of the present invention will become apparent upon consideration of the following detailed description of several specific embodiments thereof, especially when taken in conjunction with the accompanying drawings, wherein:

FIGURES 1–4 are cross-sectional views of a compressor operated in accordance with the present invention, during various operating phases thereof;

FIGURES 5 and 6 are cross-sectional views of a second compressor operated in accordance with the present invention, at various operating positions;

FIGURE 7 is a schematic diagram illustrating a system in which the compressor of FIGURES 5 and 6 is utilized;

Figure 8:
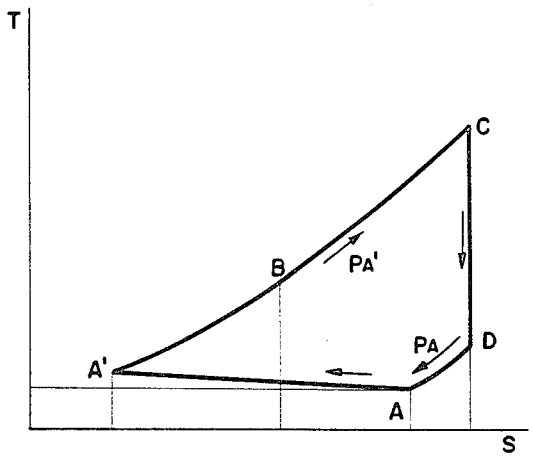
FIGURE 8 is an entropy diagram of cycles related to the system of FIGURE 7.

Reference is now made to FIGURE 1 of the drawings wherein piston 11 is illustrated as being positioned in cylinder 12 at back dead center. In cylinder 12 immediately downstream of the back dead center location of piston 11, are slotted apertures 13 for allowing gas from low pressure reservoir 14 to communicate with the back portion of the cylinder via conduit 15. Reservoir 14 is maintained at relatively low pressure, on the order of one atmosphere, and stores therein a monatomic or diatomic gas such as helium or nitrogen, respectively. Reservoir 14 supplies gas into the upper end of cylinder 12 via conduit 16 and pressure responsive valves 17 that are positioned in the top wall 18 of the cylinder.

The top dead center portion of cylinder 12 communicates with the interior of a second cylinder 19 via pressure responsive valve 21. Valve 21 is selectively biased, by suitable means such as a spring, against the back face of cylinder 19 which corresponds with the top dead center position of cylinder 12.

Within cylinder 19 is a further piston 22, having pressure responsive valve 23 located in the end thereof facing valve 21. Valve 23 is normally spring biased against the end face piston 22. Piston 22 has a hollow interior that allows the gas coupled thereto to be fed to high pressure reservoir 24, that stores gases having pressures on the order of 60 atmospheres. Pistons 11 and 22 are machines with as tight a tolerance as possible relative to the side walls of cylinders 12 and 19, respectively. Of course, pistons 11 and 22 are coupled to the side walls of their respective cylinders by piston rings 25, but dry lubrication is preferably employed for the piston rings so that contamination problems for the monatomic and diatomic gases are minimized.

Pistons 11 and 22 are synchronously driven, in a manner described infra, by drive means 26. FIGURE 1 illustrates the position of pistons 11 and 12, as well as valves 17, 21 and 23 at the beginning of each compression cycle. In particular, piston 11 is located at back dead center clearing vents 13 so that gas is admitted from reservoir 14 through vents 13 to the interior of cylinder 12. In addition, valves 17 are open because reservoir 14 has greater pressure than the cylinder interior, whereby gas is admitted through the valves to the interior of cylinder 12. Simultaneously, valve 21 is open because the pressure within cylinder 12 is greater than the pressure in lock chamber 27, located between valves 21 and 23 in the interior of cylinder 19. Drive system 26 also maintains piston 22 at the back-most portion of cylinder 19 at the beginning of the compression cycle.

In FIGURE 2, the valve positions are illustrated after piston 11 has advanced up cylinder 12 to a position where vents 13 are covered. At the point illustrated in FIGURE 2, the gas initially fed to the interior of cylinder 12 has been compressed sufficiently to cause valves 17 to be closed, while valves 21 and 23 remain in the same state as indicated by FIGURE 1. Also, drive system 26 has not altered the location of piston 22 when piston 11 has been driven half way up cylinder 12, as indicated by FIGURE 2.

In FIGURE 3, piston 11 is at the top dead center, as close as possible to wall 18, while piston 22 remains at the same location as indicated by FIGURES 1 and 2. With piston 11 at top dead center, valves 17, 21 and 23 are activated to the same states as indicated by FIGURE 2. In consequence, all of the gas within cylinder 12 is forced into the relatively small volume of lock chamber 27 between valves 21 and 23. The increasing pressure within lock chamber 27 causes valve 21 to close while piston 11 remains at top dead center because the pressure of the gas in the lock chamber exceeds the pressure of the gas in the cylinder. The increased pressure in lock chamber 27 occurs as a result of the conversion of the transient energy of the gas which resulted from the rapid acceleration of piston 11 into internal energy within the lock chamber.

At the time when the pressure in lock chamber 27 reaches the same, or a slightly greater, pressure than the pressure in reservoir 24, drive system 26 translates piston 22 to the top of cylinder 19, where valve 21 is located, as indicated by FIGURE 4. In response to the pressure in chamber 27 becoming equal to or exceeding the pressure in reservoir 24, valve 23 is opened and the highly compressed gas in the lock chamber is fed into the reservoir. As piston 22 is translated toward valve 21, gas in lock chamber 27 is scooped into reservoir 24 in a constant volume or isochore operation which occurs at approximately the pressure within reservoir 24. As the gas is being scooped from lock chamber 27 into reservoir 24 through piston 22, drive means 26 begins to withdraw piston 11 from its top dead center location, as indicated by FIGURE 4. After piston 11 has passed the midway point in its return to the back part of cylinder 12, drive means 26 begins to translate piston 22 away from valve 21. Piston 22 is returned to its initial condition, indicated by FIGURE 1, simultaneously with the return of piston 11 to back dead center, whereby a new compression cycle can be instigated.

If helium is utilized as the gas being compressed and cylinder 11 is driven with sufficient velocity and acceleration by drive means 26, as indicated by data in the table, supra, a compression factor of 60 times is derived as the helium passes between reservoirs 14 and 24. For example, helium at one atmosphere pressure supplied to cylinder 12 is compressed to 60 atmospheres in response to piston 11 being translated at a velocity of 10 meters per second (a factor of 100 times greater than the thermic wave front velocity of propagation of helium) and an initial acceleration on the order of 200 $g$'s. Driving piston 11 in such a manner causes the gas in cylinder 12 to increase in pressure from one atmosphere to twenty atmospheres in a quasi-isothermal manner. The quasi-isothermal pressure increase of the gas in cylinder 12 occurs in response to transient energy being imparted to the gas by the rapid motion of cylinder 11. The internal energy of the gas is not increased in response to the rapid motion of piston 11 because the piston travels at such a high speed that the thermic wave front is, in effect, behind the piston face. It has been found that the temperature rise normally associated with pressure waves, propagation at the speed of sound, that strike the cylinder at top dead center and are reflected from the top of the piston back to the face of piston 11 do not contribute to the increase in temperature nearly as much as the thermic wave. In consequence, the temperature of the gas within cylinder 12 is not increased as much as in typical prior processes wherein the thermic wave front propagation cannot be ignored.

In response to piston 11 reaching top dead center, butting against valves 17 and 21, as well as wall 18, FIGURE 3, the pressure within lock chamber 27 is equal to 20 atmospheres. Piston 11 now rests at top center, whereby the transient energy developed is converted to internal energy of the gas as the gas moves into and is located within lock chamber 27. The increase of internal energy of the gas within lock chamber 27, causes the pressure of the gas to increase from 20 atmospheres to 60 atmospheres. The increase in pressure occurs even though pistons 11 and 22 are both stationary and is only in response to the conversion of transient energy into internal energy. In response to the pressure increase in lock chamber 27, valve 21 is closed, whereby the increased pressure is maintained within the lock chamber and is not coupled back into cylinder 12 as piston 11 is withdrawn from top dead center. It is thus seen that the compressor apparatus described and operated according to the present invention functions, in terms of pressure, in a manner similar to a two-stage compressor, even though there is only one main compressing piston.

The basic concept of the present compressor, particularly when combined with nozzles, turbines and expansion cylinders, over typical prior art compressors is that the energy imparted to the gas by the stroke of piston 11 during compression is derived in the form of thermic waves. The thermic waves store the transient energy, $$k\frac{dU}{dt}$$

which propagate, with very little rise in total gas temperature, in cylinder 12. The transient, thermic wave energy of the gas in cylinder 12 is derived because the gas molecules have a net velocity in the direction that piston 11 moves during the compression stroke. As the piston sits at top dead center and the gas is in a state of rest, the transient energy is converted to internal energy of the gas because the net velocity of the gas decreases to zero, for statistical purposes.

It has been found that the largest increases in compression ratio are attained if the gas being compressed is monatomic. Helium, in particular, is preferred because of its relatively large thermal conductivity. It is to be understood, however, that other monatomic gases, such as argon, can be employed and that it is also possible to utilize diatomic gases.

Reference is now made to FIGURES 5 and 6 of the drawings wherein there is disclosed a second embodiment of the invention. In the embodiment of FIGURES 5 and 6, piston 22 and valve 23, which it carries, have been excluded. Otherwise, the embodiment of FIGURES 5 and 6 is constructed in exactly the same manner as indicated for the embodiment of FIGURES 1–4.

Pressure responsive valve 21 in the embodiment of the FIGURES 5 and 6, however, operates differently from the corresponding valve in the previously discussed embodiment. In particular, at the beginning of the compression cycle, when piston 11 is at back dead center clearing vents 13, valve 21 is forced to its closed position in response to the high pressure exerted thereon by reservoir 24. As piston 11 comes to top dead center, valve 21 opens because the pressure within cylinder 12 becomes equal to or slightly greater than the pressure within reservoir 24. The pressure in cylinder 12 is such as to open valve 21 in response to piston 11 reaching top dead center because of the gas pressure increase within cylinder 12 that occurs in response to the conversion of transient energy into internal energy. Of course, reservoir 24 in the embodiments of FIGURES 5 and 6, is maintained at a pressure on the order of 20 atmospheres, the approximate pressure of the gas in cylinder 12 under maximum compression.

In the embodiment of FIGURES 5 and 6, the final transfer of the stored transient energy into internal energy occurs within cylinder 19 or a portion of the system downstream of the cylinder, for example, in reservoir 24 or a heat exchanger that may be connected to it. Since the final transformation of the transient energy into internal energy does not take place within cylinder 12 the conversion operation occurs at quasi-constant pressure, i.e., at the pressure in cylinder 19, reservoir 24, or the heat exchanger.

Although the embodiment of FIGURES 5 and 6 is merely comprised of a simple piston and cylinder, wherein gas is admitted to the cylinder prior to the beginning of a compression stroke and is withdrawn from the cylinder as the piston reaches top dead center, it functions in a manner quite different from typical prior art compressors. The essential difference between the method of operating the compressor of FIGURES 5 and 6 and conventional devices is that heat is not transferred from the gas to the cylinder during the compression stroke.

Heat transfer does not occur during the compression stroke because thermic waves are propagated in cylinder 12 at a velocity less than the velocity at which the compression of the gas takes place. Because of the severe acceleration exerted by piston 11 on the gas within cylinder 12, with the resulting sudden increase in pressure of the gas within cylinder 12, the resistance of the gas against the piston during the compression stroke is reduced, whereby the temperature of the gas has a tendency to remain constant.

In typical prior art piston cylinder type compressors, the motion of the piston is initiated when the crank is in the vicinity of bottom dead center with merely a slight increase in the speed and acceleration of the piston. In response to the slow acceleration of the piston, the gas is slowly compressed so that there is no development of transient energy. In the present invention, however, gas is admitted into cylinder 12 until piston 11 attains maximum velocity. The gas is preferably admitted through vents 13, the ends of which are positioned at a point where maximum velocity of piston 11 occurs. Alternatively, valves 17 can be driven by drive system 26 so that they remain open until the piston 11 attains maximum velocity. The method of operating the present piston compressor is different from typical art compressors since, with the present invention, compression does not begin until the piston has attained maximum velocity and the velocity must be considerably greater than the thermal wave front propagation velocity.

A motor system utilizing the principles of the present invention, and the specific compressor 31 of FIGURES 5 and 6, is illustrated in FIGURE 7. In the preferred embodiment of FIGURE 7, monatomic helium is introduced into cylinder 12 of piston cylinder device 31 through vents 13 and valve 17 by way of conduits 32 and 33. It is preferred that the helium be under a pressure of several atmospheres, for example three atmospheres, so that the system operates in a more efficient manner. Compressed helium at a pressure approximately 20 times greater than the helium supplied to cylinder 12 is withdrawn from the cylinder through valve 21 in response to translation of piston 11 in the manner indicated, supra. The compressed helium gas is fed to constant pressure heat exchanger 34.

Heat exchanger 34 is fed by a source (not shown) of hot input fluid via conduit 35. Helium emerging from exchanger 34 is elevated in temperature but has substantially the same pressure as when it was derived from piston cylinder device 31. The hot gases emerging from heat exchanger 34 are supplied to expander 36, which in a typical example is an expansion turbine. Expander 36 is a constant entropy device wherein the temperature of the helium gas is considerably reduced. The energy of the hot gases flowing through expander 36 drive rotating output shaft 37 to enable work to be done.

Shaft 37 drives reduction gear 38, the output shaft of which, in turn, drives flywheels 39 and 40. Flywheels 39 and 40 are connected to each other by crank 42 that is connected to push rod 43 for driving piston 11. High mass inertia flywheel 40 is connected to an output device which, as a typical example, comprises electric generator 44.

To enable the system to be started initially, auxiliary electric starter 45 is provided. Starter 45 is geared to the shaft connecting flywheel 40 with generator 44 whereby it turns crank 42 during initial starting when the remainder of the system is at rest. Starter 45 drives rod 43 and piston 11 through crank 42 until sufficient pressure is attained by the helium gas in piston-cylinder combination 31 to enable expander 36 to drive shaft 37 by its own force. Once expander 36 begins to rotate shaft 37, auxiliary starter 45 is decoupled from the remainder of the system and the energy of the helium gas in the system, as well as helium gas supplied by an external source (not shown) as fuel thereafter, is employed for driving the expander.

The cooled gas emerging from expander 36 is supplied directly back to piston cylinder device 31, if the expander has reduced the temperature of the gas sufficiently. If however, the gas temperature is not sufficiently low, the gas emerging from expander 36 is reduced in temperature further by heat exchanger 46.

Helium is the gas preferably employed in the system of FIGURE 7 because it is monatomic and has a relatively large heat conductivity. A monatomic gas is desirable because the transient energy it is capable of deriving is greater than can be obtained from a diatomic gas or a gas having a multiplicity of atoms forming each molecule. The relatively large heat conductivity of helium is an asset because it enhances the heat transfer operations that occur in heat exchangers 34 and 46. Because a gas having a relatively great heat conductivity is employed, the sizes of heat exchangers 34 and 46, as well as the amount of hot and cold gases applied to the exchangers, are minimized.

While hydrogen has a relatively large heat conductivity, it is diatomic, whereby the amount of transient energy derived is less than for helium. Similarly, oxygen, which is 16 times denser than hydrogen, is diatomic and possesses approximately the same amount of transient energy for a given velocity of piston 11.

The operation of the motor system in FIGURE 7 can be readily understood from the entropy diagram of FIGURE 8. At point A in FIGURE 8, gas is admitted into cylinder 12 and piston 11 is at bottom dead center in a state of rest. As piston 11 is driven upwardly to top dead center, the gas in cylinder 12 undergoes a substantially isothermal compression until the end of the stroke is attained, as indicated by the entropy diagram by point A'. During the isothermal compression stroke of piston 11, the entropy of the gas in cylinder 12 decreases at a linear, relatively rapid rate. At the end of the stroke of piston 11, when it is at top dead center, the gas expands by flowing into the line connecting compressor 31 with heat exchanger 34 while the gas pressure remains substantially constant, as indicated by the isobar between points A' and B. When point B is reached, all of the transient energy developed in the gas, because of the great acceleration of piston 11 during its upward stroke, has been transferred to internal energy and the gas begins to flow into heat exchanger 34.

In heat exchanger 34, the gas temperature increases but pressure remains constant, as indicated by the isobar between points B and C, that coincides with the isobar A' and B. Gas emerging from the outlet of heat exchanger, as indicated by point C in the entropy diagram, is supplied to expander 36 and while therein undergoes an isentropic process with a substantial decrease in temperature, as indicated by line C–D. If the temperature loss in expander 36 is sufficiently great, point D corresponds with point A and the gas is supplied directly to piston device 31. In most cases, however, the gas deriving from expander 36 must be cooled further at constant pressure in heat exchanger 46. The gas propagating through heat exchanger 46 follows the isobar between points D and A and suffers a loss of temperature, as well as entropy.

The cycle of the FIGURE 8 is ideally reversible, by Planck's definition, even though the dynamic adiabatic portion of it, between points A and B, where the gas is compressed in compressor 31, may not be ideally reversible. It is also to be noted that the cycle is also self-periodic, i.e., runs at a rate determined by its own internal operation. The self-periodic cycle of the system of the FIGURE 7 is an application of the dynamic adibatic characteristic of systems functioning according to the present invention.

Because the dynamic adiabatic portion of the cycle, between points A and B, on the diagram of FIGURE 8, are not piecemeal reversible, systems operated in accordance with the present invention cannot be broken up into elements of Carnot cycles. Since Carnot cycles relate only to the internal energy of the gas while systems operating in accordance with the teachings of the present invention rely upon transient energy, this result is to be expected. It is noted, that the gas volumes at the points A, B, C and D on entropy diagram of FIGURE 8 are related in accordance with the inequalities:

$$V_A < V_B < V_C < V_A \leq V_D$$

$V_A$ equals $V_D$ if the gas emerging from expander 36 has a sufficiently low temperature to enable heat exchanger 46 to be excluded.

Work during an ideal cycle of any machine, may it be classical machines as known in the prior art, or systems utilizing transient energy in accordance with the present invention, is defined as the area bounded by the path of the process on the entropy diagram. Analyzing the entropy diagram of FIGURE 8, it is readily seen that the area bounded by the curve C–D is zero since C–D is a vertical line. The area bounded by the path A–A'–B is a dynamic adiabatic according to Equation 7 and therefore has an area equal to zero. The dynamic adibatic relationship of the process bounded by A–A'B is not evident from the diagram because temperature is not expressed in degrees absolute Kelvin. If, however, the temperature were expressed as absolute Kelvin, the area under the curve defined between the points A–A' would equal the area under the curve between points A' and B, whereby $$\int_A^B T dS = 0$$

The dynamic adiabatic process between points A and B is in agreement with the theoretical conclusion reached by Equation 7, supra. Since:

$$\int_A^B T dS = \int_C^D T dS = 0 \qquad (22)$$

it is merely necessary to find the areas under the curves of FIGURE 8 between the lines B–C and D–A to determine the work, W, performed during the cycle. In other words:

$$W = (H_C - H_B) + (H_A - H_D) \equiv (H_C - H_D) - (H_B - H_A) \qquad (23)$$

where $H_A$, $H_B$, $H_C$ and $H_D$ are indicative of the enthalpy of the gas in the system at the points A, B, C, and D, respectively, in the entropy diagram of FIGURE 8. In Equation 23, the differences $(H_C - H_B)$ and $(H_D - H_A)$ are respectively equal to the heat transferred to the gas in heat exchanger 34 and extracted from the gas in heat exchanger 46. In contrast, the difference $(H_C - H_D)$ represents the heat energy of the system extracted by expander 36 and $(H_B - H_A)$ represents the heat energy supplied to the gas in the system in compressor 31.

If heat exchanger 46 can be excluded, the work done by the system is represented by:

$$W = (H_C - H_B) \equiv (H_C - H_D) - (H_B - H_A) \qquad (24)$$

If the system can be operated so that it conforms with Equation 24, of course, it is more efficient because all of the heat lost is converted into mechanical energy utilized for driving output shaft 37 of expander 36.

Figure 9:
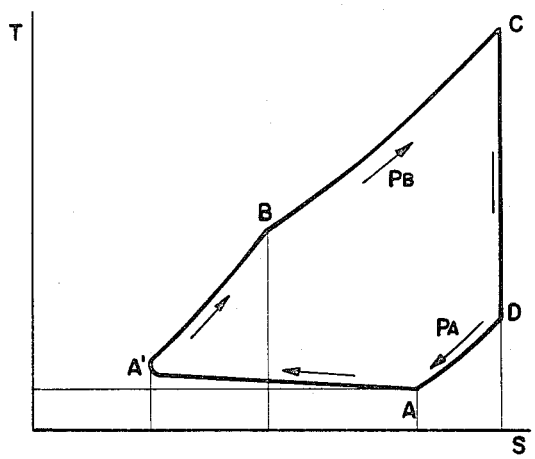
FIGURES 9 and 10 are entropy diagrams indicating the manner in which the system of FIGURE 7 functions when the compressor of FIGURES 1–4 is substituted for the compressor of FIGURES 5 and 6.

Consideration will now be given to the system of FIGURE 7, assuming that the embodiment of FIGURES 1–4 is utilized for compressor 31. The entropy diagram in such a case is illustrated by FIGURE 9. It is noted from a comparison of the FIGURES 9 and 8 that when the piston 11 reaches the top dead center and stays there, the interval along the line A'–B, that in the latter the gas has a constant volume and an increasing pressure while in the former the gas is increasing in volume but remains at constant pressure. Because the pressure increases in the process of FIGURE 9, due to the gas fed into lock chamber 27, FIGURE 1, point B thereon is at a relatively larger temperature than point 8 in FIGURE 8. Because the gases fed into the heat exchanger 34 are in FIGURE 9, considered to be at a higher temperature than with the embodiment of the FIGURE 8; point C is at a considerably higher temperature. In consequence, a system operated in conjunction with the entropy diagram of the FIGURE 9 is capable of deriving more work than a system operated in accordance with the FIGURE 8.

Figure 10:
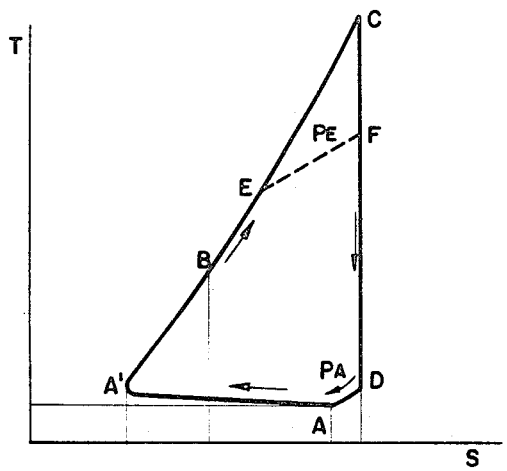

FIGURE 10 represents the entropy diagram of the system of a FIGURE 7 when it is modified to include the compressor of the FIGURES 1–4 in combination with a constant volume heat exchanger, rather than a constant pressure heat exchanger, as previously assumed. In such a system, temperature rises linearly from the point from which the gas emerges from cylinder 12 into lock chamber 27 until it is derived from heat exchanger 34. Under such conditions, the volumes of the gas at points A', B and C are ideally equal while the volume at point A is less than the volume at point C. In turn, the gas volume at point A is equal to or less than the volume at point D.

It is also possible to connect a constant volume heat exchanger with a constant pressure heat exchanger in cascade with the gases emerging from compressor 31. In such an event the cycle diagram progresses between B and E in the constant volume heat exchanger and goes between points E and F in the constant pressure heat exchanger. While less work is done in a system having both types of heat exchangers, because the area under the line defined by points E and F is less than the area under the curve defined by the line between points E and C, the combined system is, in certain instances, preferable because of the more general availability of constant pressure heat exchangers.

Figure 11:
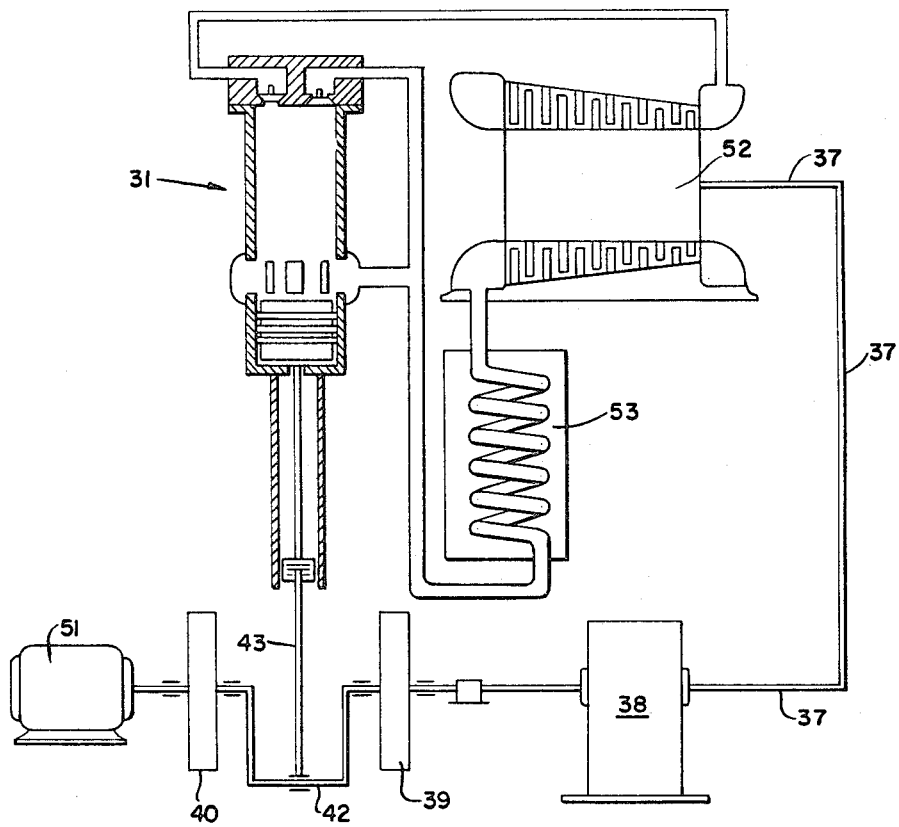
FIGURE 11 is a schematic diagram of a refrigeration system in accordance with the present invention.

Reference is now made to FIGURE 11 of the drawings wherein there is schematically illustrated a system embodying the compressor of FIGURE 5 in a refrigeration system. The refrigerating fluid, which is preferably a monatomic or diatomic gas, as indicated supra, flows into compressor 31 in the same manner indicated in conjunction with the FIGURE 7. Piston 11 of compressor 31 is driven by pushrod 43 through massive flywheels 39 and 40 and crank 42 in the same manner indicated supra. The flywheel and crank combination, however, is driven by a motor 51 that receives power from an external source, such as an A.C. power line. Gas emerging from compressor 31 is supplied directly to expander 52 which, in a typical embodiment, comprises an expansion cylinder piston device or a turbine. To prevent the turbine of expander 52 from being driven at excessive speeds, the expander shaft is coupled to pushrod 43 via coupling 37 and reduction gear 38. Gas evolved from expander 52 is fed to evaporator 53 that receives heat in a conventional manner from the body or atmosphere being cooled. The circuit is closed by feeding the heated refrigerant gas back to the inlets 13 and 17 of compressor 31.

Figure 12:
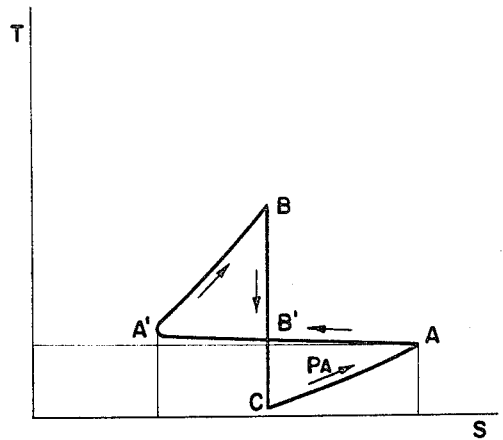
FIGURE 12 is an entropy diagram of the refrigeration process of FIGURE 11.

The entropy diagram for the refrigeration system of the FIGURE 11 is illustrated by FIGURE 12. Compressor 31, as before, causes the gas to be compressed between points A and B according to Equation 7. On reaching point B, the gas flows from compressor 31 into expander 52 where it undergoes an isentropic process, with a concurrent reduction in temperature, as indicated by the line B–C. The temperature of the gas emerging from expander 52, as indicated by point C, is thus less than the temperature of the gas at the time it was originally fed into compressor 31. The low temperature gas emerging from expander 52 is applied to evaporator 53 that operates as a constant pressure device in cooling the exterior atmosphere or fluid and heating the gas, as indicated by the isobar of FIGURE 12 between the points C and A.

In theory, the enthalpy difference ($H_A - H_C$) (the difference in the enthalpy of the gas at the time that the compression stroke of piston 11 begins and the enthalpy of the gas as it emerges from expander 52) is positive and equal to the difference between the two substantially triangular areas B'A'B and B'CA on the entropy diagram of the FIGURE 12. The positive difference between the enthalpy at points A and C represents the amount of heat received by the gas during the process and coming from the body to be cooled or atmosphere in contact with evaporator 53.

Then, theoretically, the expander 52 receives more mechanical energy than the motor 51 supplies to pushrod 43. This excess of energy is, in theory, equal to the amount of heat received by the gas. While FIGURE 11 indicates that a motor is utilized for driving piston 11, it is to be understood that expander 52 can drive piston 11 in the same manner as indicated supra, in conjunction with FIGURE 7. In theory the system would produce mechanical energy; in practice, distortion of the ideal cycle, heat leakages and frictions may necessitate an additional power source.

While I have described and illustrated several embodiments of my invention, it will be clear that variations of the details of construction which are specifically illustrated and described may be made without departing from the true spirit and scope of the invention as defined in the appended claims. For example, the refrigeration system of FIGURE 11 can be modified to include the compressor of FIGURE 1 or the compressor of FIGURE 5 can be utilized in conjunction with constant volume heat exchangers as discussed in conjunction with FIGURE 10.

I claim:

1. A method of compressing a gas having a predetermined thermic wave front velocity, C, and an internal energy, U, comprising compressing said gas, from a condition wherein $dU/dt$ is substantially zero, at a velocity sufficiently in excess of C to cause most of the work of the compression step to be transferred to the gas as energy proportional to $dU/dt$, where $t$ is time.

2. The method of claim 1 further including the step of maintaining $dU/dt$ substantially equal to zero immediately after said compression step, so that energy proportional to $dU/dt$ stored in the gas during the compression step is transferred to the gas as internal energy.

3. The method of claim 2 wherein the velocity of said compression is on the order of 100 C.

4. The method of claim 2 wherein said compression step is performed in a compression chamber supplied by a source of said gas maintained at a lower pressure than the gas after compression, and gas is supplied to said chamber by said source until the gas is compressed at substantially maximum velocity.

5. The method of claim 4 wherein a gas lock chamber is provided downstream of said compression chamber, comprising the additional steps of forcing the compressed gas in said chamber into said gas lock chamber, then reducing the volume of said gas lock chamber, and then scooping the compressed gas in said gas lock chamber into a line maintained at higher pressure than the gas in said compression chamber.

6. The method of claim 5 wherein the gas in said line is modified in temperature and expanded and then fed back to said compressor chamber as said low pressure gas source to form a closed loop cyclic process.

7. The method of claim 6 wherein the gas in said line is raised in temperature, then expanded and thereafter fed back to said compressor chamber.

8. The method of claim 7 wherein the expanded gas is cooled prior to being fed back to said compressor chamber.

9. The method of claim 7 wherein the gas in said line is heated at substantially constant pressure and expanded at substantially constant entropy.

10. The method of claim 9 further including the step of cooling the expanded gas at substantially constant pressure.

11. The method of claim 7 wherein the gas in said line is heated at substantially constant volume and expanded at substantially constant entropy.

12. The method of claim 11 further including the step of cooling the expanded gas at substantially constant pressure.

13. The method of claim 6 wherein the gas in said line is expanded so it is at temperature less than the temperature of the gas supplied to said chamber, then heated by an environment being cooled, and thereafter fed back to said compressor chamber.

14. The method of claim 13 wherein the gas is expanded at substantially constant entropy and heated at substantially constant pressure.

15. The method of claim 5 wherein said gas is maintained at constant volume from the time it is scooped into said lock chamber until $dU/dt$ is substantially equal to zero, further including the steps of heating the scooped gas at constant pressure, expanding the heated gas, and supplying the expanded gas back to said compression chamber as said low pressure source to form a closed loop cyclic process.

16. The method of claim 5 wherein said gas is maintained at constant volume from the time it is scooped into said lock chamber until $dU/dt$ is substantially equal to zero, further including the steps of heating the scooped gas at constant volume, expanding the heated gas, and supplying the expanded gas back to said compression chamber as said low pressure source to form a closed loop cyclic process.

17. The method of claim 5 wherein the compressed gas having $dU/dt$ substantially equal to zero is modified in temperature and expanded and then fed back to said compressor chamber as said low pressure gas source to form a closed loop cyclic process.

18. The method of claim 17 wherein the compressed gas having $dU/dt$ substantially equal to zero is raised in temperature, then expanded and thereafter fed back to said compressor chamber.

19. The method of claim 18 wherein the expanded gas is cooled prior to being fed back to said compressor chamber.

20. The method of claim 18 wherein the compressed gas having $dU/dt$ substantially equal to zero is heated at substantially constant pressure and expanded at substantially constant entropy.

21. The method of claim 20 further including the step of cooling the expanded gas at substantially constant pressure.

22. The method of claim 18 wherein the compressed gas having $dU/dt$ substantially equal to zero is heated at substantially constant volume and expanded at substantially constant entropy.

23. The method of claim 17 wherein the compressed gas having $dU/dt$ substantially equal to zero is expanded so it is at temperature less than the temperature of the gas supplied to said chamber, then heated by an environment being cooled, and thereafter fed back to said compressor chamber.

24. The method of claim 23 wherein the gas is expanded at substantially constant entropy and heated at substantially constant pressure.

25. The method of claim 2 wherein said gas is monatomic.

26. The method of claim 25 wherein said gas is helium.

27. The method of claim 2 wherein said gas is diatomic.

28. A method of compressing a gas having a predetermined thermic wave front velocity, C, and an internal energy, U, comprising compressing said gas, from a condition wherein $dU/dt$ is substantially zero, at a velocity sufficient in excess of C to prevent a substantial rise in temperature of the gas during the compression step, where $t$ is time.

29. The method of claim 28 further including the step of maintaining $dU/dt$ substantially equal to zero immediately after said compression step.

30. A thermodynamic process comprising the steps of substantially isothermally compressing a gas from a low pressure source while substantially decreasing the entropy of said gas and maintaining the pressure of the compressed gas substantially constant to increase the temperature of the gas.

31. The method of claim 30 further including the steps of substantially isentropically expanding said gas, and feeding the expanded gas to said compressor as the gas from the low pressure source.

32. The process of claim 31 further including the step of heating the compressed gas prior to the compressed gas being supplied to said expander.

33. The process of claim 31 wherein said expanded gas is reduced in temperature to a value less than the temperature of the gas of said source, and heating said expanded gas by an environment being cooled.

34. A compressor for increasing the pressure of a source of low pressure gas comprising a cylinder, a piston, means for translating said piston between the lower and the upper end of said cylinder, means for admitting gas from said source into said cylinder until said piston has attained substantial velocity while being translated from said lower end to said upper end, a lock chamber at the upper end of said cylinder, normally open first pressure responsive means for selectively admitting gas from said cylinder to said chamber, normally closed second pressure responsive means for selectively removing gas from said chamber to a passage downstream of said first pressure responsive means, and means for decreasing the volume of said chamber while said piston is at the upper end of said cylinder.

35. The compressor of claim 34 wherein said means for admitting comprises a plurality of vents at the lower end of said cylinder.

36. The compressor of claim 34 wherein said means for admitting comprises valve means at the upper end of said cylinder, and means for synchronizing the translation of said piston with the opening of said valve means.

37. A thermodynamic motive system utilizing a gas as a power source, said gas having a predetermined velocity of thermic wave front propagation, C, means for compressing said gas at a velocity sufficiently in excess of C to cause the gas to be substantially isothermally reduced in entropy, and for maintaining the pressure of the compressed gas substantially constant while the temperature of the gas increases substantially, means responsive to the compressed increased temperature gas for expanding said gas, and means responsive to gas emerging from said expander for feeding the expanded gas to said means for compressing.

38. The system of claim 37 wherein said means for compressing includes means for admitting the expanded gas thereto until the gas being compressed is at substantially maximum velocity.

39. The system of claim 38 further including means disposed between said compressing means and said expander for heating the gas, driven means responsive to and coupled to said expander, and means coupling said driven means to said compressing means to form a closed loop cyclic system.

40. The system of claim 39 further including auxiliary starting means coupled to said driven means.

41. The system of claim 38 further including a heat exchanger for cooling an external environment, said heat exchanger being responsive to said gas emerging from said expander, and means for feeding said gas emerging from said heat exchanger to said compressing means.

42. The system of claim 41 further including an external power source for driving said compressing means.

References Cited
UNITED STATES PATENTS 2,776,087   1/1957   Walter.

HENRY F. RADUAZO, *Primary Examiner.*

UNITED STATES PATENT OFFICE
CERTIFICATE OF CORRECTION

Patent No. 3,387,773                                June 11, 1968

Henry de Beaumont

It is hereby certified that error appears in the above numbered patent requiring correction and that the said Letters Patent should read as corrected below.

Column 1, line 28, for "devired" read -- derived --; line 71, strike out "of"; column 2, line 43, for "theromodynamics" read -- thermodynamics --; column 5, line 28, for "fiinal" read -- final --; lines 42 to 44, the equation should appear as shown below instead of as in the patent:

$$dS = \frac{C_v}{T} dT$$

column 9, line 64, beginning with "the temperature" strike out all to and including "sound, that" in line 66, same column 9, and insert instead -- pressure waves propagating at the speed of sound which --; column 13, line 9, for "adibatic" read -- adiabatic --; line 23, for "$V_a$", first occurrence, read -- $V_a'$ --; column 14, line 32, for "A" read -- C --; line 33, for "C" read -- A --.

Signed and sealed this 11th day of February 1969.

(SEAL)
Attest:

EDWARD M. FLETCHER, JR.                      EDWARD J. BRENNER
Attesting Officer                              Commissioner of Patents